DRILLING-HEAD FOR THE SINKING OF SHAFTS, GALLERIES AND THE LIKE

Original Filed June 29, 1956 4 Sheets-Sheet 1

INVENTOR
Georges Allimann

By Karl W. Flocks
Attorney

DRILLING-HEAD FOR THE SINKING OF SHAFTS, GALLERIES AND THE LIKE

Original Filed June 29, 1956 4 Sheets-Sheet 2

INVENTOR
Georges Allimann

By Karl W. Flocks
ATTORNEY

DRILLING-HEAD FOR THE SINKING OF SHAFTS, GALLERIES AND THE LIKE

Original Filed June 29, 1956 4 Sheets-Sheet 3

INVENTOR
Georges Allimann

BY KARL W. FLOCKS
ATTORNEY

DRILLING-HEAD FOR THE SINKING OF SHAFTS, GALLERIES AND THE LIKE

Original Filed June 29, 1956 4 Sheets-Sheet 4

INVENTOR.
Georges Allimann
BY KARL W. FLOCKS
ATTORNEY

United States Patent Office

Re. 25,470
Reissued Nov. 5, 1963

25,470

DRILLING-HEAD FOR THE SINKING OF SHAFTS, GALLERIES AND THE LIKE

Georges Allimann, Mulhouse, France, assignor to Ateliers de Carspach, Carspach (Haut-Rhin), France, a French joint-stock company Original No. 2,976,027, dated Mar. 21, 1961, Ser. No. 594,821, June 29, 1956. Application for reissue Dec. 18, 1962, Ser. No. 246,306
Claims priority, application France July 2, 1955
2 Claims. (Cl. 262—7)

Matter enclosed in heavy brackets [ ] appears in the original patent but forms no part of this reissue specification; matter printed in italics indicates the additions made by reissue.

The present invention has for its object a drilling machine for the boring of levels or galleries, shafts, or cutting-holes in mines, quarries or works-sites.

Said machine is essentially mechanical both in its components and controls, which renders it very robust. It does not moreover require any powerful application thereof against the wall of the rock in order to carry out the boring of this wall; this results in the machine being light and of a low over-all size.

The machine according to the invention comprises a rotary head, a plurality of drilling rotating plates on the head, provided on their top face with picks [inclined] *having cutting edges facing* toward the direction of rotation of the plates, said plates being set at an angle with a plane perpendicular to the longitudinal axis of the machine and their axis being inclined relative to planes comprising this longitudinal axis, means for rotating said head, means for rotating said plates, and means for removing the muck as the machine advances.

Other features and advantages of the present invention will become apparent from the description which will follow below, and which is made with reference to the attached drawings.

Figure 1:
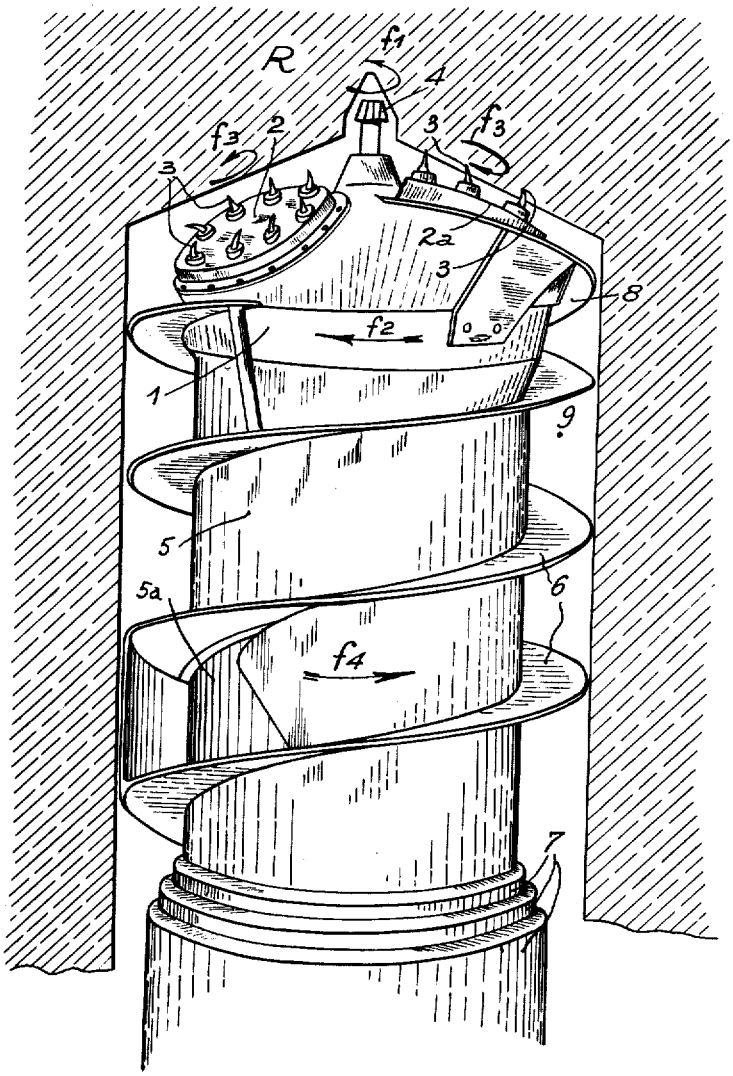
FIG. 1 is a view in elevation of a drilling machine in accordance with the invention.
Figure 2:
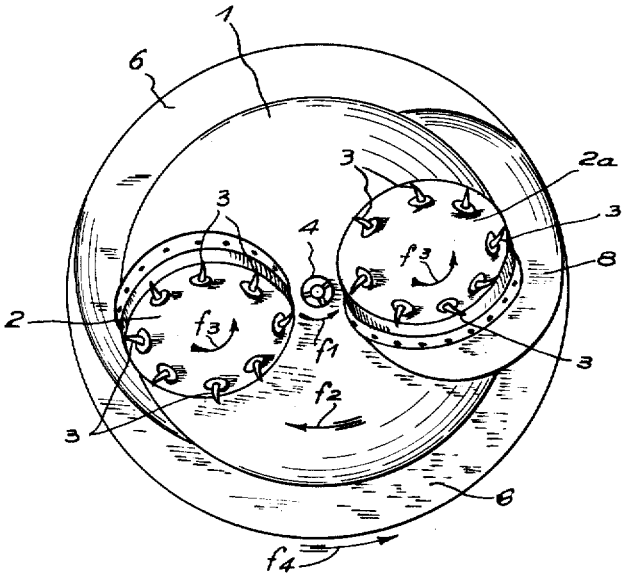
FIG. 2 is an end view of the drilling machine.

In the form of embodiment shown in FIGS. 1 and 2, the drilling machine in accordance with the invention comprises a head 1 provided with two circular plates 2—2a. These plates rotate about their own axes and each carry on their top face, a series of picks 3 [inclined] *having cutting edges facing* toward the direction of rotation of the plates. These plates are set at an angle to a plane perpendicular to the longitudinal axis of the machine, and their axes are inclined relative to any plane comprising this longitudinal axis.

The drilling machine comprises, in addition, a central pilot drill 4. This precedes a skirt or casing 5 around which is fixed an Archimedean screw 6. This skirt and this screw in their turn precede a plurality of telescopic tubes 7. A tipper or shovel 8 is formed on the head in order that the drilling products may be suitably brought on to the evacuation screw 6.

Figure 4:
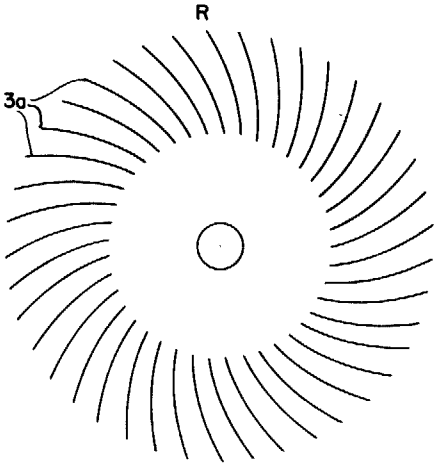
FIGS. 3 and 4 are explanatory diagrams showing how the machine operates.
Figure 3:
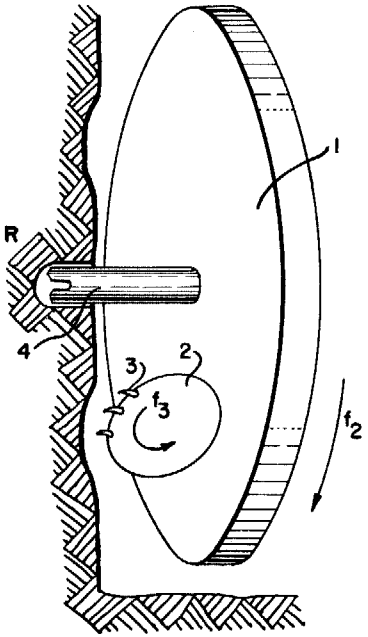

The operation of this drilling machine is as follows:

The pilot drill 4 first of all attacks the rock R which is to be drilled. If it is assumed that this drill rotates in the direction of the arrow f1, the head 1 which carries it will rotate in the opposite direction (arrow f2) in order to compensate its reaction. By reason of the proper rotation of the head on its own axis, of the rotation of the plates 2—2a and of their positions, the picks 3 can strike the wall of the rock each in its turn after which each is immediately withdrawn in the same way as with the blow of a pick (FIGS. 3 and 4). In FIGURE 4 markings 3a show such pick blows. They result from the rotation of the plate carrying the picks and from the rotation of the head and are constituted by portions of a cycloid. The direction of rotation of the plates is not important; the direction of rotation indicated by the arrow f3 has been given by way of example only. In this case, it enables the reaction of the drill 4 to be compensated and contributes to the correct balance of the machine.

The pieces of rock broken away from the wall by the cutters striking each in its turn and for a short period of time at each stroke, are removed by the Archimedean screw 6 which is fixed to the skirt 5. This skirt rotates about its own axis in the direction of the arrow f4, in such manner that the products broken off from the wall of rock are evacuated to the exterior of the cavity 9 which is bored by the drilling head. As the drilling head advances into the wall of rock, the telescopic tubes 7 extend and push the head outwards so as to enable it to carry out its work. The products collected by the Archimedean screw 6 can then be discharged towards the exterior by using the extended series of tubes 7.

To this end, an opening 5a may be formed in the skirt 5 in order that the products collected by the screw 6 may pass inside the tubes. This opening may be formed in the skirt just behind the head and after the tipper 8. The current supply cables, for example for the motor housed inside the head 1, and which is preferably electric, also employ the channel provided by the tubes which follow each other.

Figure 5:
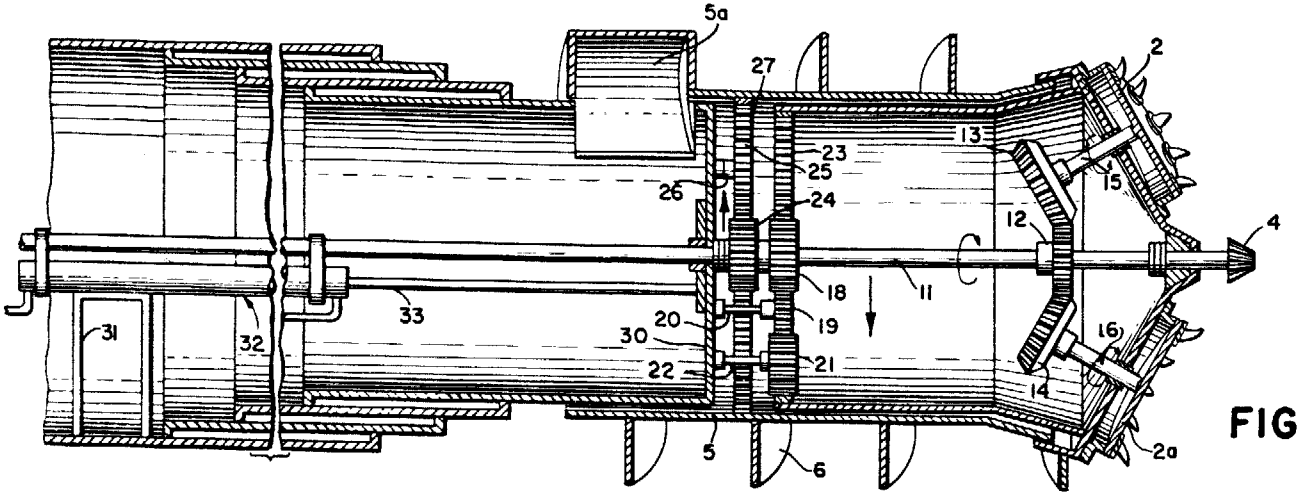
FIG. 5 is a longitudinal section thorugh the drilling machine of FIG. 1.

Referring now to FIG. 5, it may be seen that the head 1 has a main drive shaft 11 extending axially therein, the shaft 11 having the pilot drill 4 mounted thereon. A pinion 12 on shaft 11 is in engagement with a pair of driven gears 13 and 14 which serve to drive the plates 2 and 2a through the shafts 15 and 16, respectively. These plates 2 and 2a may be at different distances from the center of rotation of the head 1.

The head 1 is rotated from a pinion 18 on drive shaft 11, this pinion engaging with a pair of transfer pinions 19 and 21, carried by arbors 20 and 22; pinion 21 drives ring gear 23 attached to the head 1.

Adjacent pinion 18 is a pinion 24 for driving the skirt or casing 5, the pinion 24 engaging with a tranfer gear 25 that is carried by arbor 26 and engages with ring gear 27 on the skirt 5. As will be obivous, the directions of rotation of the various members will be as stated hereinabove, and as indicated by appropriate arrows.

The telescopic tube 7 having the smallest diameter is provided with a bulkhead 30, this bulkhead having the arbors 20, 22 and 26 affixed to it. The opening 5a of the skirt 5 enters the innermost tube 7 immediately rearwardly of bulkhead 30, to thereby prevent the rock debris from coming into contact with the above mentioned gearing.

The outermost telescopic tube 7 is provided with a support 31 that carries a fluid motor or jack 32, which has a piston rod 33 secured to the bulkhead 30. By actuation of the jack 32, the tubes 7 may be extended to push the head 1 forward.

Figure 6:
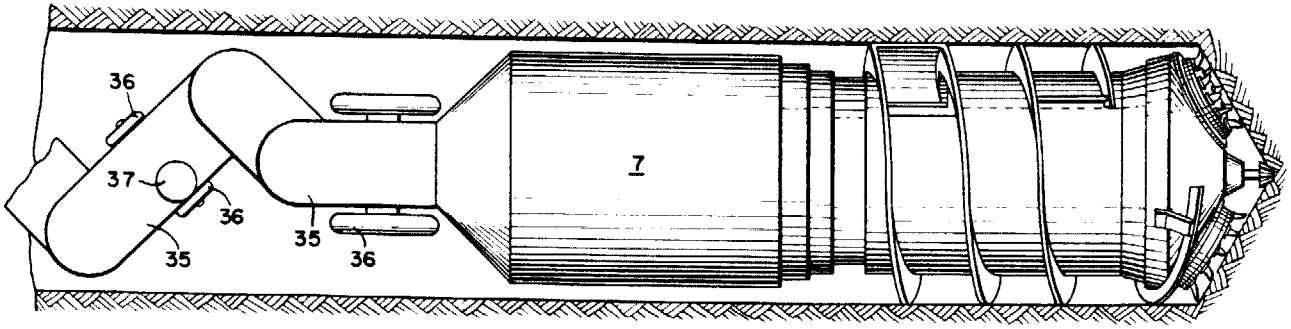
FIG. 6 is a diagrammatic showing of the drilling machine of FIG. 1 and a part of an attached evacuation device.

In FIG. 6 there is shown the machine of FIGS. 1 and 5, together with a conveyor apparatus for removing the rock debris from the tubes 7. This may take the form of a plurality of jointed tubes, each supported on wheels 36 and having therewithin suitable Archimedean screws (not shown), driven by a motor 37.

The head 1 is always accessible; it is quite easy for a person to gain access to the head through a man-hole provided in one of the tubes 7.

The pilot drill 4 is optional and it is possible to envisage a drilling machine similar to that of the invention which would have no pilot drill.

By the use of the drilling machine shown in FIGS. 1 and 2 cylindrical cavities are obtained.

In a general way, the above description has only been given by way of indication and without any implied limitation, and the invention is capable of a large number of alternative forms in accordance with its spirit.

I claim:

1. In a drilling machine for the excavation of galleries and the like, a rotary head, a plurality of rotary drilling plates on the head provided on their top face with picks [inclined] *having cutting edges facing* toward the direction of rotation of the plates, said plates being set at an angle with a plane perpendicular to the longitudinal axis of the machine and their axes being inclined relative to any plane comprising this longitudinal axis, means for rotating said head, means for rotating said plates, and means for removing the muck as the machine advances.

2. In a drilling machine for the excavation of galleries and the like, a rotary head, a plurality of rotary drilling plates on the head provided on their top face with picks

[inclined] *having cutting edges facing* toward the direction of rotation of the plates, said plates being set at an angle with a plane perpendicular to the longitudinal axis of the machine and their axes being inclined relative to any plane comprising this longitudinal axis, said plates being positioned at different distances from the center of rotation of said rotary head, means for rotating said head, means for rotating said plates and means for removing the muck as the machine advances.

References Cited in the file of this patent or the original patent

UNITED STATES PATENTS

| | | |
|---|---|---|
| 556,985 | Hurd | Mar. 24, 1896 |
| 1,043,185 | Wittich | Nov. 5, 1912 |
| 1,353,908 | Hodgson | Sept. 28, 1920 |
| 1,417,363 | Wadsworth | May 23, 1922 |
| 2,118,490 | Challocombe | May 24, 1938 |
| 2,466,709 | Kar | Apr. 12, 1949 |
| 2,758,825 | Wohlmeyer | Aug. 14, 1956 |
| 2,760,766 | Mayo | Aug. 28, 1956 |

FOREIGN PATENTS

| | | |
|---|---|---|
| 62,281 | Denmark | Oct. 31, 1941 |
| 2,544 | Great Britain | of 1876 |